United States Patent
Cho et al.

(10) Patent No.: US 7,336,875 B2
(45) Date of Patent: Feb. 26, 2008

(54) ENHANCEMENT OF OPTICAL AND MECHANICAL PROPERTIES IN A POLYMERIC OPTICAL ELEMENT BY ANNEALING UNDER A COMPRESSED GAS

(75) Inventors: Han Sol Cho, Gyeonggi-Do (KR); Jin Taek Hwang, Daejeon-Si (KR); Jin Sung Choi, Gyeonggi-Do (KR); Sung Hen Cho, Daejeon-Si (KR); Young Mok Son, Gyeonggi-Do (KR); Yong Young Park, Daejeon-Si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 34 days.

(21) Appl. No.: 10/807,338

(22) Filed: Mar. 24, 2004

(65) Prior Publication Data

US 2004/0223708 A1 Nov. 11, 2004

(30) Foreign Application Priority Data

Mar. 24, 2003 (KR) .......... 10-2003-0018165
Dec. 3, 2003 (KR) .......... 10-2003-0087110

(51) Int. Cl.
*G02B 6/02* (2006.01)
(52) U.S. Cl. .................... 385/123; 385/102
(58) Field of Classification Search ........ 385/100, 385/102, 123
See application file for complete search history.

(56) References Cited

U.S. PATENT DOCUMENTS

| | | | | |
|---|---|---|---|---|
| 3,088,793 A | * | 5/1963 | Knudsen et al. | 264/182 |
| 4,069,286 A | * | 1/1978 | Greenhalgh | 264/85 |
| 4,541,979 A | * | 9/1985 | Cooke et al. | 264/1.31 |
| 5,026,147 A | * | 6/1991 | Soane et al. | 359/328 |
| 6,468,451 B1 | * | 10/2002 | Perez et al. | 264/48 |

OTHER PUBLICATIONS

"The effect of carbonyl group on sorption of $CO_2$ in glassy polymers", Shieh et al., J. of Supercritical Fluids 25 (2003) pp. 261-268.

"Glass Transitions in Polymer/$CO_2$ Mixtures at Elevated Pressures", Journal of Polymer Science: Part B: Polymer Physics, vol. 29, pp. 631-633 (1991) R.G. Wissinger and M.E. Paulaitis.

(Continued)

*Primary Examiner*—Ellen E. Kim
(74) *Attorney, Agent, or Firm*—Harness, Dickey & Pierce, PLC

(57) ABSTRACT

A method for treating a polymeric optical element which includes the steps of mounting a polymeric optical element into a chamber, injecting a compressed gas as an annealing medium into the chamber and annealing the polymeric optical element and removing the annealing medium from the chamber. The present method provides a new way of preventing disadvantageous molecular orientation and residual stress which causes a deterioration in the optical properties of the polymeric optical element.

10 Claims, 3 Drawing Sheets

OTHER PUBLICATIONS

"High Temperature Resistant Graded-Index Polymer Optical Fiber", by Sato et al., Journal of Lightwave Technology, vol. 18, No. 12, Dec. 2000.

"Plastic Optical Fibers: An Introduction to Their Technological Processes and Applications", Zubia et al., Optical Fiber Technology 7, pp. 101-140 (2001).

"Liquid Crystal Devices: Physics and Applications", V.G. Chigrinov, pp. 274-278, Artech House (Apr. 1999).

Rheology: Principles, Measurements and Applications, Ch. W. Macosko, John Wiley and Sons (1994), pp. 408-411.

"Polymers for waveguide and Integrated Optics: Technology and Applications", by R.A. Horank, Marcel Dekker (1992), Microptical Grating Elements, pp. 187-191.

Portions of "Polymers for Photonic Applications I. Nonlinear Optical and Electroluminescence Polymers", by C. Bosshard et al., Springer Verlag (Mar. 2002), pp. 18, 60, and 110.

* cited by examiner

ENHANCEMENT OF OPTICAL AND MECHANICAL PROPERTIES IN A POLYMERIC OPTICAL ELEMENT BY ANNEALING UNDER A COMPRESSED GAS

BACKGROUND OF THE INVENTION

This non-provisional application claims priority under 35 U.S.C. § 119(a) on Korean Patent Applications Nos. 2003-18165 and 2003-87110 filed on Mar. 24, 2003 and Dec. 3, 2003, respectively, which are herein incorporated by references.

1. Field of the Invention

The present invention relates to an enhancement of the optical and mechanical properties in a polymeric optical element by an annealing process performed under a compressed gas, and more particularly to a method of improving optical and mechanical properties of a polymeric optical element by annealing a polymeric optical element using a compressed gas under supercritical conditions.

2. Description of the Related Art

Examples of optical elements made of polymeric materials, include polymeric plastic optical fibers, optical waveguides, micro-mirrors, lenses, light guide panels of liquid crystal displays, diffusers, and holographic optical elements (HOE), which are for use in the field of displays (refer to "Polymers for Waveguide and Integrated Optics: Technology and Applications", by R. A. Horank, Marcel Dekker (1992); "Liquid Crystal Devices: Physics and Applications", by V. G. Chigrinov, Artech House (April, 1999); and "Polymers for Photonic Applications I. Nonlinear Optical and Electroluminiscence Polymers", by C. Bosshard et al., Springer Verlag (March, 2002)).

In the production of polymeric materials, disadvantageous molecular orientation or residual stress is frequently experienced due to thermal history or flow history caused during the polymerization and molding process (refer to "Rheology: Principles, Measurements and Applications", by Ch. W. Macosko, John Wiley and Sons (1994)). As a general solution for removing the undesired molecular orientation or residual stress, there has been proposed to conduct an annealing process at high temperature. This method, however, may cause deterioration in physical properties due to deformation or degradation of the elements. Especially, communication plastic optical fibers having a long light transmission path are intensely affected by the above disadvantages.

In general, optical loss of plastic optical fiber is relatively higher than that of quartz based optical fiber, and this is mainly caused by C—H absorption inside the polymers. Such optical loss largely depends on wavelengths of an optical source. In the case of PMMA(poly(methyl-methacrylate)), the optical loss theoretically exceeds 70 dB/km at a wavelength of 650 nm. Also, the optical loss resulting from Rayleigh scattering due to density fluctuation is more than 10 dB/km. In addition to the above-described intrinsic optical losses, there may be extrinsic optical losses resulting from exterior factors caused during fabrication such as, for example, the impurity of unreacted monomers. Summing up the intrinsic and extrinsic optical losses described above, the overall optical loss in plastic optical fibers generally exceeds at least 150 db/km.

The plastic optical fiber is generally fabricated through extrusion or preform drawing. In the case of a graded index type plastic optical fiber, having a refractive index gradually varied in a radial direction, the generally used fabrication method is that a cylindrical polymer rod, namely, a preform having a desired refractive index distribution, is thermally drawn while being heated in a furnace (refer to "Plastic optical fiber: An Introduction to Their Technological Processes and Applications", by J. Zubira and J. Arrue, Optical Fiber Technol., pp. 101-140, vol. 7(2001)). During the thermal drawing of the plastic optical fiber, the furnace temperature, the preform input speed, and the optical fiber drawing speed should be properly controlled. If these conditions are not appropriately controlled, a high drawing tension may be produced in the final plastic optical fiber, resulting in an increase in the optical loss. When plastic optical fibers are annealed at a temperature near or higher than the glass transition temperature, the residual stress of the fibers is removed and the length of the fibers is shortened. (refer to "High Temperature Resistant Graded-Index Polymer Optical Fiber", by M. Sato et al., J. Lightwave Technol., pp. 2139-2145, vol. 18(2000)). This means that a great deal of polymer chain orientation is induced during the drawing of the plastic optical fiber. Although there are substantially few reports as to how the polymer chain orientation affects optical properties of the plastic optical fiber, it is generally well known by those skilled in the art that when a preform having a high molecular weight is fabricated and thermally drawn, the result is a large amount of optical loss. In addition, if the preform is drawn at high speed in order to enhance the productivity of thermal drawing, the result is an increase of the drawing tension, thereby making it difficult to fabricate a high performance plastic optical fiber. Therefore, it can be said that the molecular weight range, which enables a plastic optical fiber having excellent mechanical and optical properties to be fabricated with high productivity, is narrower than the thermal drawing possible molecular weight range.

SUMMARY OF THE INVENTION

Accordingly, a feature of the present invention is to provide a method for removing molecular orientation and residual stress, which causes a deterioration in the optical properties of a polymeric optical element, by annealing the polymeric optical element under compressed gas.

In accordance with the present invention, there is provided a method for treating a polymeric optical element which includes the steps of: a) mounting a polymeric optical element in a chamber; b) introducing a compressed gas as an annealing medium into the chamber and annealing the polymeric optical element; and c) removing the annealing medium from the chamber.

In accordance with another feature of the present invention, there is provided a polymeric optical element treated by the above method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
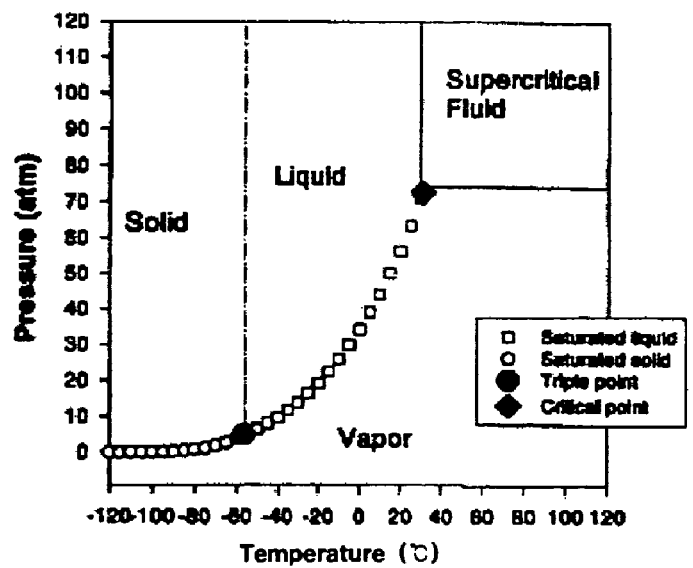
FIG. 1 is a phase equilibrium diagram of $CO_2$.

Reference will now be made in greater detail to preferred embodiments of the present invention, an example of which is illustrated in the accompanying drawings.

In the present invention, the term "annealing" is defined as the action of immersing a polymeric optical element in an annealing medium under specific temperature and pressure conditions for a time required to induce an enhancement in optical properties of the polymeric optical element.

It is a well known fact that glass transition temperatures of various polymers decrease under high pressure $CO_2$. In the general case of atactic PMMA, it has a glass transition temperature of approximately 110° C., and this glass transition temperature falls to 275 K as the atactic PMMA becomes completely swollen under supercritical $CO_2$ (refer to R. G. Wissinger, M. E. Paulaitis, J. Polym, Sci.: Part B: Polym. Phys. 29, pp. 631-633 (1991)). It is further reported that such a glass transition temperature normally decreases to approximately 65° C. under high pressure $CO_2$, even if the $CO_2$ is not in the supercritical phase. Furthermore, it is well known that, in the case of PMMA, $CO_2$ is adsorbed by carbonyl bonds (C=O) in the repeating units (refer to "*The effect of carbonyl group on sorption of $CO_2$ in glassy polymers*", by Y. T. Shieh & K. H. Liu, J. Supercritical Fluid (2003)).

In consideration of the above-described, well known facts, it has been determined, according to the present invention, that the optical properties of a polymeric optical element can be enhanced by annealing using an annealing medium under supercritical conditions or high density conditions approaching supercritical conditions. With such annealing, unreacted monomers remaining in the polymeric optical element are removed, and a discontinuous or interlayer structure in the polymeric optical element is changed into a continuous structure. Further, the optical properties of the resulting polymeric optical element can be enhanced by removing the residual stress.

In the present invention there is provided a method, which is applicable to all polymeric optical elements so long as these polymeric optical elements are made of amorphous polymers, and their external shapes are defined through a process using heat and flow, for example, a thermal drawing process.

As constitutional materials of such a polymeric optical element, amorphous polymers having a good transparency, such as polycarbonate, polystyrene, poly(methacrylate), poly(methyl-methacrylate), poly(trifluoromethyl-methacrylate, poly(tetrapropyl-fluoromethyl-methacrylate, Teflon AF, or cytop, can be used.

As an annealing medium for the polymeric optical element, a solvent or non-solvent material can be used alone or in combination.

The annealing medium may include supercritical fluid or liquid phase or vapor phase compressed gas having a condition approaching the supercritical fluid. Further, the annealing of the polymeric optical element can proceed with the variation of temperature and pressure conditions in order to allow for the phase of the annealing medium to be varied. Especially when the annealing medium is varied from liquid phase to gas phase through supercritical phase, a rapid phase change is prevented and stability of the perform morphology is maintained.

Concrete examples of the annealing medium intended to be used in the present invention can include, but are not limited to, supercritical fluids of $CO_2$, $SF_6$, $C_2H_6$, $CCl_3F$, $CClF_3$, $CHF_3$, isopropanol, etc. More preferably, supercritical $CO_2$ is used. Such supercritical $CO_2$ is advantageous for use as the annealing medium, since it is eco-friendly, effectively dissolves most organic materials, swells most amorphous polymers, and is relatively easy in reaching supercritical conditions.

A critical temperature and pressure of $CO_2$, as can be seen from FIG. 1 illustrating a phase equilibrium diagram of $CO_2$, are 31.1° C. and 72.0 atm, respectively. In the present invention, temperature and pressure conditions of $CO_2$ for use as the annealing medium of the present invention ranged from about 10 to 100° C. and from about 2 to 200 atm, more preferably, from 35 to 60° C. and from 10 to 100 atm, respectively. As stated above, not only the supercritical $CO_2$ but also liquid phase and vapor phase $CO_2$ in a range approaching the supercritical condition is applicable as the annealing medium.

In order to induce a more improved annealing effect, the temperature and pressure of the annealing medium may be maintained at a constant level, and furthermore may be varied according to a periodic function or non-periodic function during annealing.

After completing annealing of the polymeric optical element, the annealing medium is removed from the reactor chamber. Such a removal of the annealing medium is achieved by discharging the annealing medium while gradually reducing the temperature and pressure. In this case, in order to prevent bubble formation or damage to a resulting optical fiber, the decreasing rate of the temperature and pressure should be controlled. The temperature and pressure rate during discharge of the annealing medium can be varied according to the kinds of annealing medium used.

After the discharge of the annealing medium is completed, the polymeric optical element can be subjected to a vacuum, or can be heated simultaneously with being subjected to vacuum to completely remove the annealing medium.

Hereinafter, the present invention will be described in more detail with reference to the following Examples. However, these Examples are given for the purpose of illustration and thus are not to be construed as limiting the scope of the present invention.

EXAMPLE 1

Figure 2:
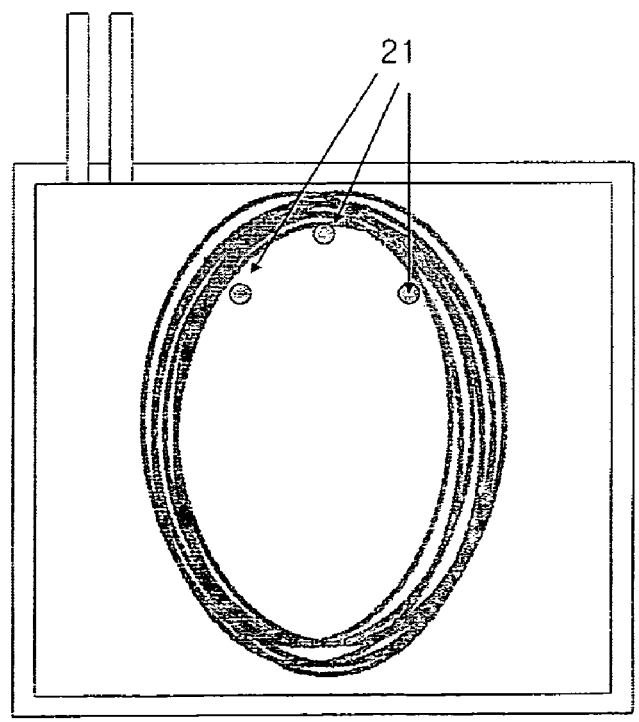
FIG. 2 is a sectional view illustrating a state wherein a polymeric optical element is mounted in a high pressure chamber in accordance with the present invention.

In the present embodiment, there is used an SI(step index) type plastic optical fiber having a structure wherein its clad is made of a copolymer of methyl-methacrylate and tetrafluoro-propyl-methacrylate in a molecular ratio of 7.5:2.5, and its core is made of poly(methyl-methacrylate), the fiber having an average molecular weight of 100,000, a molecular weight distribution of 2.1, and a diameter of 1 mm. The SI type plastic optical fiber in a length of 30 m is mounted inside a high pressure chamber in a state wherein it is hung on three pins as shown in FIG. 2, and annealing is performed. As an annealing medium, $CO_2$ is used, and the temperature and pressure conditions inside the high pressure chamber are adjusted as represented in Table 1. In case of an example 1-5, the annealing of the optical fiber is performed while the phase of the annealing medium $CO_2$ is repeatedly varied between a supercritical phase and a vapor phase. The temperature and pressure variation rates are 3° C./min and 2 atm/min, respectively. After annealing, $CO_2$ gas is discharged and the interior space of the chamber is subjected to a vacuum for one hour by means of a vacuum pump, and then argon gas is injected into the chamber at atmospheric pressure to obtain the final plastic optical fiber. In order to show the effect of the annealing, the optical loss is determined for the non-treated and treated plastic optical fiber using 1 mW 650 nm RCLED (resonant cavity light emitting diode). The results are shown in Table 1 below.

TABLE 1

| Example | annealing condition (temperature: ° C./ pressure:atm/time:min) | optical loss (dB/km) | | |
|---|---|---|---|---|
| | | before annealing | after annealing | difference |
| 1-1 | (45/70/240) | 210 | 190 | −30 |
| 1-2 | (45/70/120) | 210 | 195 | −15 |
| 1-3 | (40/50/240) | 210 | 205 | −5 |
| 1-4 | (20/80/30)→ (45/80/5)→ (45/60/120) | 210 | 195 | −15 |
| 1-5 | (45/80/5) ↔(45/60/5) repeating 20 times | 210 | 170 | −40 |

EXAMPLE 2

Figure 3:
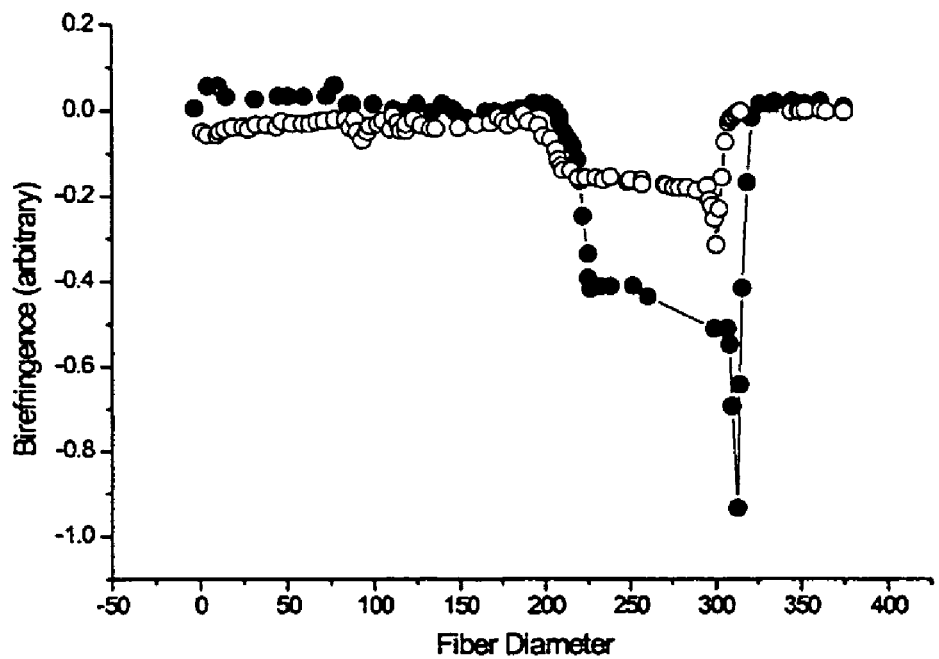
FIG. 3 is a graph of birefringence vs. diameter for a graded index type plastic optical fiber, which is annealed at a pressure of 20 atm and a temperature of 40° C. for four hours under compressed $CO_2$.
Figure 4:
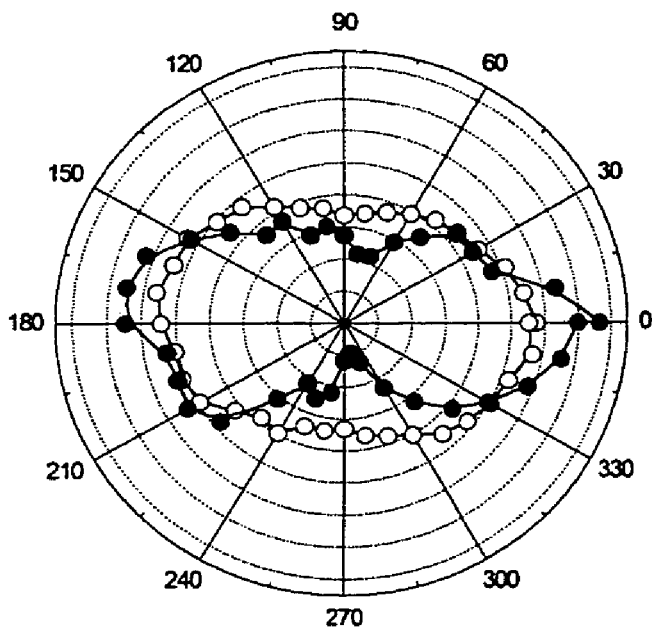
FIG. 4 is a polar plot illustrating a birefringence distribution of the optical fiber of FIG. 3.
Figure 5:
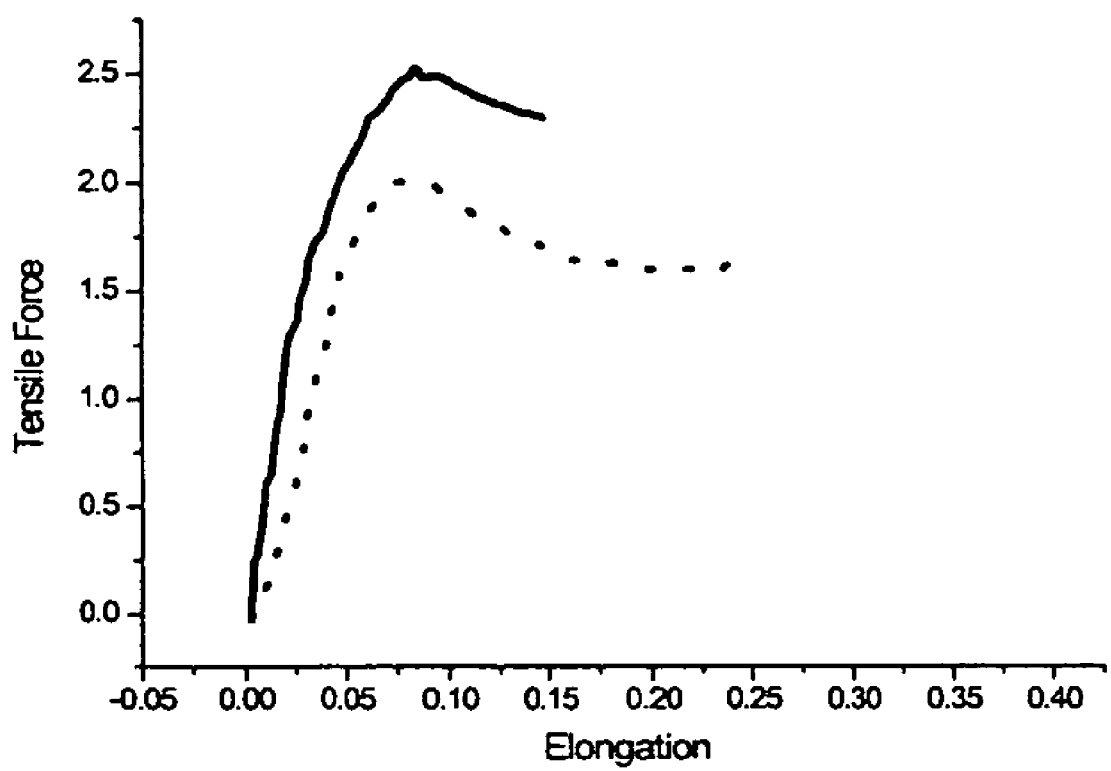
FIG. 5 is a graph of tensile force vs. elongation for the optical fiber of FIG. 3.

In the present embodiment, there is used a plastic optical fiber having a diameter of 0.75 mm, which is obtained by fabricating a graded refractive index type perform wherein its clad is made of a copolymer of methyl-methacrylate and tetrafluoro-propyl-methacrylate in a molecular ratio of 8:2. The composition of the copolymer varies according to the center of a core so as to result in a molecular ratio of 9.5:5 at the center of the core, and having a diameter of 55 mm. The fabricated perform is drawn at a speed of 55 m/min. The obtained, graded refractive index type optical fiber, in a length of 10 m, is mounted inside a high pressure chamber in a state wherein it is hung on three pins, as shown in FIG. 2. The annealing is performed at a pressure of 20 atm and a temperature of 40° C. for four hours. Before and after the annealing, the birefringence in a radial direction for an optical fiber sample having a length of 5 cm is measured, with the results being shown in FIG. 3. Further, the birefringence distribution is measured and represented in FIG. 4 as a polar plot. In FIGS. 3 and 4, the black dots denote the birefringence before annealing, and the white dots denote the birefringence after annealing. It can be seen from FIG. 3 that the birefringence largely produced in the boundary region between the clad and core is decreased after the annealing, and from FIG. 4 that the birefringence in an angular direction of 180° disappeared. Meanwhile, from FIG. 5 showing the results obtained by measuring the tensile strength with an Instron, it can be clearly understood that the elongation of the optical fiber is considerably increased after the annealing (marked with a dotted line). This means that the optical fiber is endowed with ductility, resulting in a plastic optical fiber having a high bending strength.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for post-processing of an amorphous, transparent polymeric optical element, which comprises:
    a) mounting an amorphous polymeric optical element into a chamber;
    b) introducing a compressed gas in a supercritical phase or a liquid or vapor phase approaching the supercritical phase as an annealing medium into the chamber and annealing the amorphous polymeric optical element; and
    c) removing the annealing medium from the chamber.

2. The method of claim 1, wherein the amorphous polymeric optical element is made of an amorphous transparent polymer.

3. The method of claim 2, wherein the amorphous polymeric optical element is selected from the group consisting of polycarbonate, polystyrene, poly(methacrylate), poly(methyl-methacrylate), poly(trifluoro-methyl-methacrylate), poly(tetra-propyl-fluoro-methyl-methacrylate), Teflon AF, and cytop.

4. The method of claim 1, wherein the amorphous polymeric optical element is a plastic optical fiber.

5. The method of claim 1, wherein the compressed gas is a solvent or a non-solvent material for the polymeric optical element, or a mixture thereof.

6. The method of claim 5, wherein the annealing medium is a material selected from the group consisting of $CO_2$, $SF_6$, $C_2H_6$, $CCl_3F$, $CClF_3$, $CHF_3$, and isopropanol.

7. The method of claim 1, wherein, in step b), the annealing is performed with a variation of temperature and pressure conditions of the annealing medium.

8. The method of claim 1, wherein, in step b), temperature and pressure of the annealing medium are varied according to a periodic or non-periodic function.

9. An amorphous polymeric optical element produced by the method of claim 1.

10. The amorphous polymeric optical element of claim 9 which is a plastic optical fiber having a core and a clad, said core being made of polymethyl methacrylate and said clad being made of a copolymer of methyl methacrylate and tetrafluoropropyl methacrylate.

* * * * *